United States Patent [19]

Fernholz et al.

[11] 3,864,383

[45] Feb. 4, 1975

[54] PROCESS FOR THE PREPARATION OF UNSATURATED NITRILES

[75] Inventors: Hans Fernholz, Fischbach/Taunus; Dieter Freudenberger, Diedenbergen/Taunus, both of Germany

[73] Assignee: Farbwerke Hoechst Aktiengesellschaft vormals Meister & Bruning, Frankfurt am Main, Germany

[22] Filed: Mar. 23, 1973

[21] Appl. No.: 344,161

Related U.S. Application Data

[63] Continuation of Ser. No. 218,507, Jan. 17, 1972, abandoned.

[30] Foreign Application Priority Data

May 19, 1971 Germany............................ 2124755

[52] U.S. Cl........................ 260/465.9, 260/465.8 R
[51] Int. Cl............................................ C07c 12/04
[58] Field of Search.................. 260/465.9, 465.8 R

[56] References Cited

UNITED STATES PATENTS 3,558,688   1/1971   Drinkard, Jr. ................... 260/465.9
3,711,527   1/1973   Kurtz ........................ 260/465.9 UX

*Primary Examiner*—Joseph P. Brust
*Attorney, Agent, or Firm*—Curtis, Morris & Safford

[57] ABSTRACT

Improvement of a process for the preparation of unsaturated nitriles from hydrocyanic acid and esters of unsaturated alcohols and carboxylic acids in the gaseous phase in the presence of carrier catalysts containing copper(II) salts, cobalt salts or mixtures of both salts, by additionally passing hydrogen halide, water or oxygen or oxygen containing gases, in admixture or as single components, over the catalyst either simultaneously with the reactants or alternately one after the other.

9 Claims, No Drawings

PROCESS FOR THE PREPARATION OF UNSATURATED NITRILES

This application is a continuation application of pending application Ser. No. 218,507, filed Jan. 17, 1972, now abandoned.

The present invention provides a continuous process for the preparation of olefin nitriles by gas phase reaction of hydrocyanic acid with esters of unsaturated alcohols and carboxylic acids having from 1 to 10 carbon atoms, in the presence of metal salt containing catalysts on carrier materials.

The preparation of olefin nitriles is already known: it is carried out by reaction of the corresponding unsaturated halides with metal cyanides in a similar manner as a cyanide alkylation according to Kolbe, where the olefin halides react either with alkali cyanides or with heavy metal cyanides. The analogous reaction of organic halides with basic ion exchangers in the form of cyanide gives only poor yields despite relatively long reaction times.

For the preparation of unsaturated nitriles, also the reaction in the liquid phase of the corresponding alcohols or alcohol/ester mixtures with metal cyanides in the presence of free mineral acid is described.

Besides poor yields, the former processes have the disadvantage of a relatively lengthy and uneconomic technique. As cyanide source, mostly metal cyanide is employed; thus necessarily large amounts, i.e., stoichiometric amounts, of the corresponding metal halides are formed. This does not only cause losses of valuable starting product, i.e., halogen, but also considerable problems arise regarding the removal or use of the metal salts which are formed.

Moreover, when heavy metal cyanides are employed as cyanide source, large amounts of isonitrile and other undesired by-products are always formed.

Also different gas phase reactions are known for the preparation of unsaturated nitriles, for example the reaction of allyl chloride with hydrocyanic acid in the presence of a copper/aluminum oxide catalyst. This process, however, gives only poor yields of olefin nitrile, and simultaneously, a great number of undesired by-products are formed.

Recently, two further processes for the preparation of especially 3,4-unsaturated nitriles by reaction, in the gaseous and in the liquid phase, of corresponding unsaturated carboxylic acid esters with hydrocyanic acid in the presence of copper (I) halide catalysts have been described. Of these two processes, the liquid phase method furnishes good yields, but its disadvantage resides in the fact that the catalyst mixtures dissolved in the liquid reaction mixture for their work-up must be separated in complicated operations and then prepared anew, thus rendering this method uneconomic, especially in a continuous process.

Moreover, the normally insoluble copper(I) halide, which has to be present at least in a molar concentration, must be dissolved and kept in solution in a complicated operation by adding special solutes in order to ensure the activity of the catalyst. Thus, especially in a continuous process, also by-products are retained in undesired amounts which concentrate in the reaction sump during the work-up.

Furthermore, in both processes the copper catalyst must be present in its monovalent form and kept in this state, which requires complicated uneconomic operations under a protecting nitrogen atmosphere and under reducing conditions which have to be strictly observed.

For applying the copper(I) chloride to the carriers employed in the cited gas phase process and for attaining the necessary catalytic activity, also special nitrogen containing solvents are required, the use of which unnecessarily increases the costs of the process and, moreover, causes only a relatively poor space-time yield of the catalysts employed.

A process for the preparation of unsaturated nitriles from hydrocyanic acid and esters of unsaturated alcohols and carboxylic acids in the gaseous phase has now been found wherein the reactants are passed over carrier catalysts impregnated with compounds selected from the group consisting of a copper(II) salt, a cobalt salt and a mixture of both salts, preferably with addition of a Lewis acid.

The carboxylic acids simultaneously formed in this process are recovered in practically quantitative amounts and may thus be used again, according to known methods, for the preparation of the starting materials, thus establishing a closed recycling system for the carboxylic acid component without any of the wastes problems of the former processes.

The starting materials employed in the process of the invention, i.e., esters and hydrocyanic acid, may be reacted in an equimolar as well as in a non-stoichiometric mixture. The reactants may be added separately, the hydrocyanic acid advantageously being passed over the catalyst directly in its gaseous form; but they may also be fed in together, a solution of liquid hydrocyanic acid being vaporized in the ester employed, and the vapor mixture being passed over the catalyst. After having passed the reaction zone, the reactant being possibly in excess may be easily separated, fractionated and recycled without any alteration together with the carboxylic acid which has formed. Many variations of the process thus are made possible, as well as an easy handling from a technical viewpoint.

The starting materials are hydrocyanic acid on the one hand, on the other unsaturated esters of an olefin alcohol and a carboxylic acid having from 1 to 10 carbon atoms. Examples of these acids are formic, acetic, propionic, butyric, valeric, caproic, enanthic, caprylic, pelargonic or capric acid, furthermore cyclic, unsaturated or dicarboxylic acids.

As unsaturated alcohols, compounds having from 2 to 8 carbon atoms may be employed, for example allyl or methallyl alcohol, butenol, pentenol, but also olefin alcohols having more than one double bond in the molecule, for example pentadienol, and unsaturated bifunctional alcohols, for example butenediol; the use of which results in the obtention of unsaturated dinitriles.

Reaction products of the process of the invention nearly exclusively are the olefin nitriles desired in each case and the carboxylic acids corresponding to the esters employed. By-products are present only in insignificant amounts. Secondary reactions can be nearly completely avoided, since the product mixture is cooled and condensed immediately after having left the hot reaction zone.

The reaction mixture generally is worked up by fractional distillation. It might be necessary to employ an auxiliary agent in the case where substances of similar boiling points are to be separated. When for example an olefin nitrile such as allyl cyanide is distilled, it is advantageous to separate it from the acetic acid which has formed by adding an amount of water which is forming an azeotropic mixture. Thus, the acetic acid can be recovered in a completely pure form being free from allyl cyanide, although the boiling points of the pure components are differing by only 0.1°C. The pure carboxylic acid so obtained may be reused without further work-up for a new preparation process of ester (for example allyl acetate) according to known methods.

The reaction temperatures of the process of the invention are in the range of from 50° to 350°C, preferably from 100° to 250°C, especially above 150°C.

The reaction may be carried out under a pressure the range of which may be widely varied. Advantageous are pressures of from 0.5 to 50 absolute atmospheres, especially from 1 to 5 absolute atmospheres.

The addition of volatile inert substances, for example nitrogen, does not adversely affect the reaction; on the contrary, this is very advantageous in the case where relatively high boiling esters are used, since the formation of liquid precipitates on the catalysts is avoided and thus their longtime performance is improved.

As catalyst, there are used copper(II) salts or cobalt salts, or a mixture of both salts, preferably as a mixture with Lewis acids, which are applied to suitable carriers. Copper or cobalt halides are preferred as salts. The total amount of the catalyst mixture applied to the carrier material may be very widely varied; generally, it is from 5 to 40 percent by weight, preferably from 10 to 30 percent by weight, especially about 25 percent by weight of the total mass of the catalyst.

It is a rather surprising fact that, in the process of the invention, not the copper(I) compounds described in the former processes, but copper(II) salts and, furthermore, also salts of cobalt alone may be used as catalytically active components for the formation of the nitriles.

The mixing ratio of copper salt and/or cobalt salt, preferably copper halide and/or cobalt halide to Lewis acid may be deliberately chosen. Generally, good results are obtained using catalyst mixtures the components of which are present in about equal amounts.

As Lewis acids, for the process of the invention there may be used for example chromium(III) chloride, manganese(II) chloride, zinc chloride, nickel(II) chloride, aluminum chloride, titanium(III) chloride, beryllium chloride, zirconium(IV) chloride, antimony(III) chloride, bismuth(III) chloride, ferric chloride, tin(IV) chloride, molybdenum(III) chloride, cadmium(II) chloride, boron(III) chloride, gallium(III) chloride, indium(III) chloride, thallium(III) chloride, cerium(IV) chloride, or vanadium(III) chloride. It is also possible to use the analogous bromides, for example molybdenum(III) bromide, aluminum bromide or zinc bromide. Preferably, sinc chloride or nickel chloride, in admixtures as well as alone, are employed as Lewis acids.

As copper and/or cobalt salts, especially copper halides and/or cobalt halides may be employed. Suitable copper salts for the process of the invention are salts of bivalent copper, suitable cobalt salts are those of bivalent cobalt. Apart from the chlorides, also bromides, nitrates, cyanides, sulfates and acetates may be used as salts; the chlorides generally being preferred.

The activity of these salts, especially of the chlorides, is surprisingly superior to that of the salts cited for the former processes. For example, space-time yields of much more than 300 g/l.h may be attained using the catalyst mixtures composed according to the present invention. However, the catalytic activity of the catalyst mixtures is not attained by simply summing up the activity of each component, which effect previously could not be expected.

Since the process does not require anhydrous operation, it is possible to impregnate the catalysts with the catalytically active substances in an aqueous solution and subsequently to simply dry the catalyst material in known manner.

When the catalyst mixtures in accordance with the invention are used, the hydrocyanic acid is able to liberate the less volatile, higher boiling and more acidic carboxylic acids from their compounds also in the gaseous phase.

Thus, the hydrocyanic acid is a cheap and technically easily obtainable cyanide source.

As carrier material for the catalysts, suitable compounds for the process of the invention are silicium dioxide, aluminum oxides, active charcoal, zirconium oxide, aluminum silicates or molecular sieves. But also other carriers may be used.

The gas phase reaction in accordance with the present invention may be carried out as a fluid or fixed bed process. Of the different operation modes, the following method is advantageous for the continuous preparation of olefin nitriles: Hydrocyanic acid and olefin ester are mixed in the desired ratio, the reactants generally being in equimolar amounts. It is preferable to mix the liquid hydrocyanic acid directly with the olefin ester and to introduce this mixture into a vaporizer apparatus. The vaporization temperature depends on the reaction mixture used in each case and generally is above 100°C. The amount added within the unit of time may be chosen as desired and depends only on the dimensioning of the catalyst system connected to the vaporizer. After the vaporization, the now gaseous reaction mixture is passed over the catalyst; a simultaneous addition of nitrogen or another inert gas or steam being favorable sometimes but not necessary.

By a corresponding control, the catalyst temperature is maintained at the desired level. After having left the reaction oven, the reaction mixture being in gaseous or vapor state is immediately cooled and fractionated. Reactants which have not been converted and carboxylic acid which has formed are reemployed correspondingly after their purification.

The process according to the invention so described has the advantage of yielding relatively very pure olefin nitriles in a technically simple and profitable manner with excellent long duration results, which olefins otherwise can only be obtained with simultaneous formation of large amounts of wastes and by-products and with rapidly decreasing catalyst yields.

The olefin nitriles obtained in the process of the invention are valuable organic intermediate products for example for the preparation of epoxy nitriles and unsaturated carboxylic acids.

It has now been found that the above described continuous process for the preparation of olefin nitriles--; especially with respect to the industrial long time use of the described catalysts can still be improved by taking certain additional steps.

The improvement comprises passing over the catalyst--; either simultaneously with the reactants or alternately therewith, hydrogen halide, especially hydrogen chloride, and/or water and/or oxygen or oxygen containing gases, in admixture or as single components.

The process of the invention especially allows an economic manufacture of the desired olefin nitriles during sufficiently long periods in constant yields and with excellent space-time results.

The necessary operations therefore comprise, besides the use of the active catalyst components copper-(II) salt or cobalt salt or a mixture of both salts, preferably with addition of a Lewis acid, a simultaneous or interval activation of the total catalyst or single components thereof with hydrogen halide, especially hydrogen chloride, and/or water and/or oxygen or oxygen containing gases.

This additional activation according to the present invention results in better yields of olefin nitrile and a substantially increased life of the catalysts by using the necessary small amounts of hydrogen halide, especially hydrogen chloride and/or water, and/or oxygen or oxygen containing gases which are added alternately or simultaneously without provoking an increased formation of undesired oxygen or halide containing by-products.

By the alternate or simultaneous treatment of the catalysts with hydrogen halide and/or water and/or oxygen or oxygen containing gases in accordance with the invention as described, a substantial increase of the yield and life of the catalyst is attained, thus only ensuring the profitability of the olefin nitrile synthesis of the invention.

The amounts of hydrogen halides, especially hydrogen chloride, and/or water and/or oxygen or oxygen containing gases used may be widely varied. Advantageously, from 0.01 to 0.1 mol, preferably about 0.05 mol per mol of olefin ester of hydrogen halide is employed, water is used in an amount of from 0.5 to 0.05 mol, especially of about 0.1 mol per mol of olefin ester, and oxygen in an amount of from 0.01 to 2.0 mols, preferably from 0.05 to 1.0 mol, especially of 0.1 mol per mol of olefin ester.

The catalyst solutions used are extremely resistant catalysts which excellently withstand repeated switching-on and -off and extreme variations of the temperature in a range of from 20°C to 600°C, as this partially occurs during the auxiliary operations of the process of the invention as described, as well as, quite generally, they withstand hard continuous operation conditions, thus contributing also to the profitability of the process.

The steps taken result in a new process which is far superior to the older processes and which allows to achieve space-time yields of up to 400 g/l.h in continuous runs. This total yield of the new process, however, is not attained by simply summing up the single steps taken, i.e., choice of the catalyst mixture, addition of hydrogen chloride, water and oxygen, but only the combination of all these factors brings about this constant high yield, which effect previously could not be expected.

The process according to the invention so described has the advantage of yielding relatively very pure olefin nitriles in a technically simple and profitable manner with excellent long duration results, which olefins otherwise can only be obtained with simultaneous formation of large amounts of wastes and by-products and with rapidly decreasing catalyst yields.

The following Examples illustrate the invention.

EXAMPLE 1

A mixture of 100 g of allyl acetate and 27 g of hydrocyanic acid is introduced, within 1 hour, into a vaporizer flask heated to 200°C–250°C. The vapor mixture is blown into the reaction tube heated to 200°C together with 22.4 l/h of nitrogen.

In the reaction tube, 100 ml of catalyst are present; the catalyst being an aluminum oxide carrier which has been impregnated with copper(II) chloride in aqueous solution. In the receiver at the end of the reaction oven, 122 g of condensate containing 35 g of allyl cyanide are obtained, which corresponds to a space-time yield of 350 g/l.h.

After 1 hour, the reaction tube is replaced by a new one. Hydrogen chloride gas (2 l/h) and subsequently air (22.4 l/h) are then passed over the used catalyst for 30 minutes each. The catalyst is then again connected with the vaporizer flask and the above operation is repeated.

By this method, allyl cyanide having practically constant space-time yields of from 320 to 360 g/l.h is obtained within a period of 5 days.

EXAMPLE 2

The test is run according to Example 1, but simultaneously with the mixture of allyl acetate and hydrocyanic acid, 1 l/h of hydrogen chloride gas is added. After 1 hour, the reactants are switched over to a second reaction tube, while the used one is treated with 22.4 l/h of air.

By this method, within a total of 35 hours, an average space-time yield of 320 g/l.h of allyl cyanide is obtained.

EXAMPLE 3

The method is as described in Example 1. Instead of $Al_2O_3$, $SiO_2$ is used as carrier for the copper(II) chloride catalyst. Together with the mixture of 1 mol each of allyl cyanide and hydrocyanic acid as described in Example 1, simultaneously 1 l/h of a mixture of air and hydrogen chloride gas is passed through the reaction tube. The addition of nitrogen is reduced to 0.5 mol/h. Thus, a space-time yield of 285 g/l.h of allyl cyanide and some allyl chloride (1 mol percent, relative to allyl cyanide) is obtained. In this run, the reaction tube is not replaced.

EXAMPLE 4

The method is as described in Example 1, but as catalyst, an aluminum oxide carrier impregnated with a mixture of equal amounts of copper(II) chloride and cobalt(II) chloride is used.

After 1 hour, the vaporizer is switched over to the second reaction tube, and the first one is treated for 30 minutes each with at first a mixture of 9 g/h of $H_2O$ and 6 l/h of hydrogen chloride gas and subsequently with 22.4 l/h of air, and then connected anew to the vaporizer flask.

Thus, a constant space-time yield of 395 g/l.h of allyl cyanide is obtained.

EXAMPLE 5

1 mol each of methallyl acetate and hydrocyanic acid are vaporized, and the vapor mixture is passed within 60 minutes over 100 ml of aluminum oxide impregnated with copper(II) chloride. Within the same time, 11.2 l of nitrogen and 1 l of hydrogen chloride are passed over the catalyst. After each hour of test time, the whole is switched over to a second reaction tube, and 11 l of air are blown over the first catalyst within 1 hour.

By this method, methallyl cyanide having a boiling point of 137°C can be synthetized during long periods in a space-time yield of 338 g/l.h.

We claim:

1. A gas phase process for the preparation of olefinic nitriles having 3 to 6 carbon atoms selected from the group consisting of allyl cyanide, methallyl cyanide, butenyl cyanide and pentenyl cyanide, from hydrocyanic acid and esters of unsaturated alcohols having 2 to 5 carbon atoms, said unsaturated alcohols being selected from the group consisting of allyl alcohol, methallyl alcohol, butenol, pentenol, butenediol and pentadienol and carboxylic acids having 1 to 10 carbon atoms selected from the group consisting formic, acetic, propionic, butyric, valeric, caproic, enanthic, caprylic, pelargonic and capric acid, wherein the reactants are passed at a temperature from 50° to 350°C and under a pressure of from 0.5 to 50 atmospheres absolute, over a supported catalyst consisting essentially of from 5 to 40 percent by weight of total catalyst, of a compound selected from the group consisting of the chlorides, bromides, nitrates, cyanides, sulfates and acetates of bivalent copper or bivalent cobalt or mixtures thereof and wherein an auxiliary agent selected from the group consisting of hydrogen chloride, water, molecular oxygen, gases containing molecular oxygen and mixtures thereof, are passed either simultaneously with the reactants or alternatively therewith over the said catalyst.

2. A process as claimed in claim 1, wherein the auxiliary agents are passed over the catalyst simultaneously with the reactants.

3. A process as claimed in claim 1, wherein the auxiliary agents and the reactants are alternately added to the catalyst.

4. A process as claimed in claim 1, wherein from 0.05 to 0.5 mol of water per mol of olefin ester is used.

5. A process as claimed in claim 1, wherein 0.1 mol of water per mol of olefin ester is used.

6. A process as claimed in claim 1, wherein from 0.01 to 2.0 mol of molecular oxygen or molecular oxygen containing gas per mol of olefin ester, relative to oxygen, is used.

7. A process as claimed in claim 1, wherein from 0.05 to 1.0 mol of molecular oxygen or molecular oxygen containing gas per mol of olefin ester, relative to oxygen, is used.

8. A process as claimed in claim 1, wherein 0.1 mol of molecular oxygen or molecular oxygen containing gas per mol of olefin ester, relative molecular oxygen, is used.

9. A gas phase process for the preparation of olefinic nitriles having 3 to 6 carbon atoms selected from the group consisting of allyl cyanide, methallyl cyanide, butenyl cyanide and pentenyl cyanide, from hydrocyanic acid and esters of unsaturated alcohols having 2 to 5 carbon atoms, said unsaturated alcohols being selected from the group consisting of allyl alcohol, methallyl alcohol, butenol, pentenol, butenediol and pentadienol and carboxylic acids having 1 to 10 carbon atoms selected from the group consisting formic, acetic, propionic, butyric, valeric, caproic, enanthic, caprylic, pelargonic and capric acid, wherein the reactants are passed at a temperature from 50° to 350°C and under a pressure of from 0.5 to 50 atmospheres absolute, over a supported catalyst consisting essentially of from 5 to 40 percent by weight of total catalyst, of a compound selected from the group consisting of the chlorides, bromides, nitrates, cyanides, sulfates and acetates of bivalent copper or bivalent cobalt or mixtures thereof together with a Lewis acid selected from the group consisting of the chlorides or bromides of chromium (III) manganese (II), zinc, nickel (II), aluminum, titanium (III), beryllium, zirconium (IV), antimony (III), bismuth (III), iron (III), tin (IV), molybdenum (III), cadmium (II), boron (III), gallium (III), indium (III), thallium (III), cerium (IV), and vanadium (III), said Lewis acid being present in an amount approximately equal to that of the bivalent copper compound or bivalent cobalt compound or mixture thereof, and wherein an auxiliary agent selected from the group consisting of water, molecular oxygen, gases containing molecular oxygen and mixtures thereof, are passed either simultaneously with the reactants or alternatively therewith over the said catalyst.

* * * * *